April 11, 1939.  F. V. HARTMAN  2,154,044
FLUID TANK
Filed Feb. 8, 1937  2 Sheets-Sheet 1

INVENTOR.
F. V. HARTMAN
BY George L. Wallace
ATTORNEY.

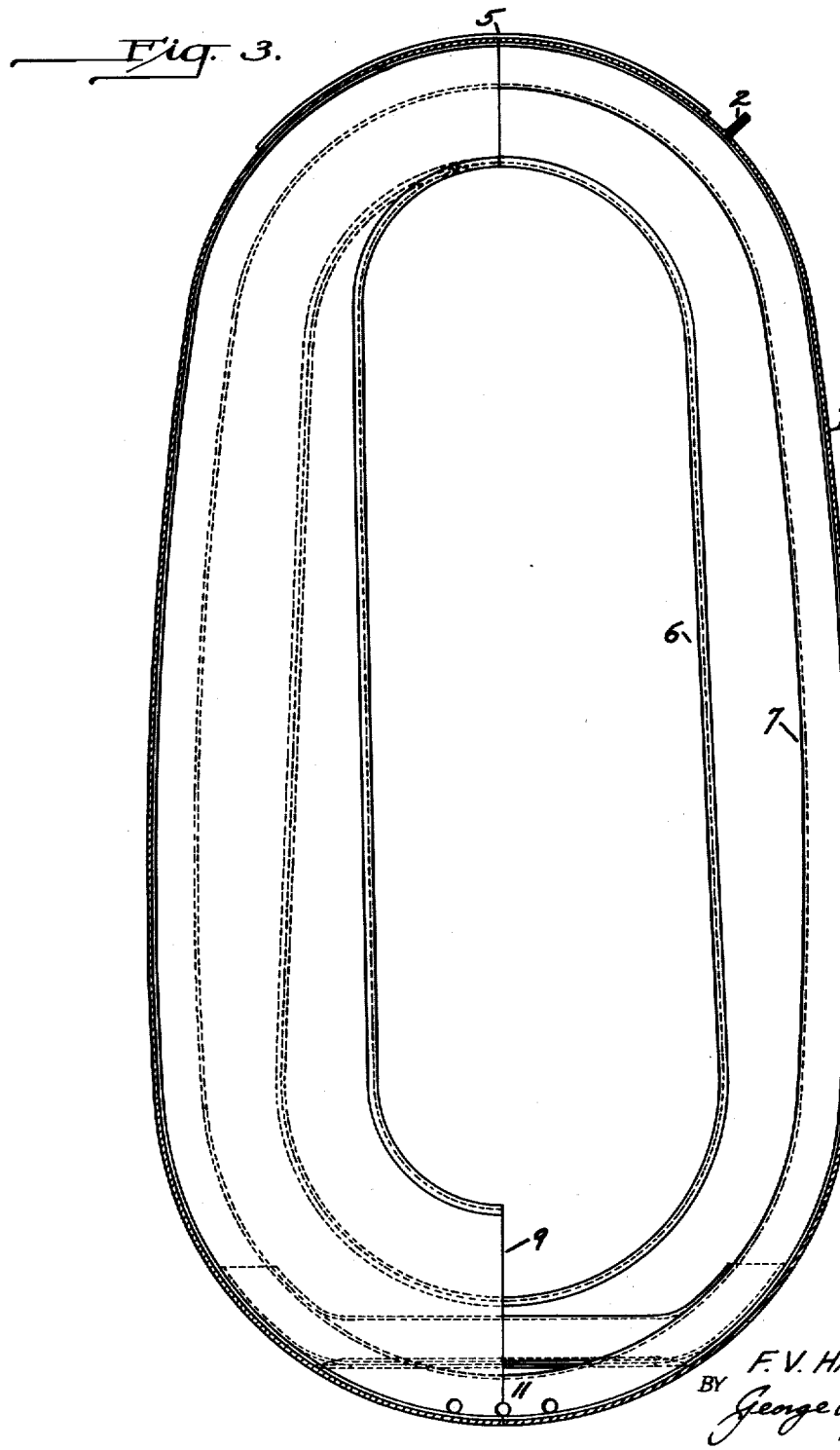

Patented Apr. 11, 1939

2,154,044

UNITED STATES PATENT OFFICE 2,154,044

FLUID TANK

Frederick V. Hartman, New Kensington, Pa., assignor to Aluminum Company of America, Pittsburgh, Pa., a corporation of Pennsylvania Application February 8, 1937, Serial No. 124,612

5 Claims. (Cl. 220—71)

This invention relates to fluid storage tanks, and particularly to tanks for use in connection with the storage of fuel for automobiles, airplanes, and the like.

In articles of the type to which this invention is directed, it has been the desire to fabricate a unit which is not only light in weight, but one which is sufficiently rigid to withstand the forces set up in use from the weight of the contents and vibrations.

It is an object of this invention to provide a fluid tank which may be made of light gauge sheet stock, such as aluminum, and which is of such construction that failure between adjoining parts of the tank due to vibration is eliminated.

More specifically, the invention contemplates a structure which is particularly resistant to vibration stresses, and in which the ordinarily used tie rods and intermediate baffles and cross baffles are eliminated, thereby cutting down the dead weight of the unit.

A further object of this invention is the provision of a fluid tank having a series of continuous girders of particular shape intimately joined to the skin of the tank, as by welding, thereby providing a degree of rigidity and strength heretofore unobtainable.

Another and further object of this invention is the provision of a fluid receptacle having one-piece rib stiffening members intermediate the continuous girders formed to the contour of the tank, thereby eliminating points of possible failure in these members.

Another object is the provision of a tank of the character above set forth, in which all parts are united by welding, thereby eliminating failures which are generally attendant where riveting is employed in articles which are subjected to severe vibratory usage.

These and other objects of my invention will appear from a reading of the specification, of which the drawings form a part, and in which Fig. 1 is a plan view of the tank;

Fig. 3 is a view taken on line III—III of Fig. 1, being partially in section.

Figure 1:
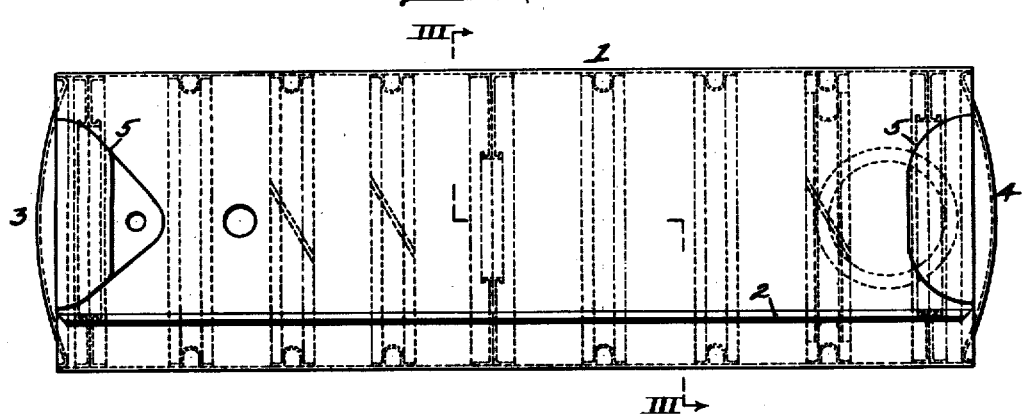

In the drawings, reference numeral 1 designates the skin or shell of the tank, which may be a single sheet of light gauge metal, or which may be built up from several such sheets. This skin or shell may be formed to any suitable shape, the one depicted herein, for example, being elliptical. The ends of the shell are joined together at 2 by a seam weld. The ends of the tank are closed by preformed heads 3 and 4, both of these heads being welded to the shell 1 around its entire periphery. At the top ends of the tank, a reinforcing strip or pad 5 may be welded to the shell for the purpose of taking up end thrust. This member, as best shown in Fig. 3, extends a short distance on each side of the vertical center line of the tank. In one application, this tank is carried in a rubber cushioned saddle in the bomb rack of the plane, and is so balanced that should the bombing plane be pursued by a faster ship, the tank can immediately be released, thereby lessening the load which the ship has been carrying, so that greater speeds may be obtained.

Figure 2:
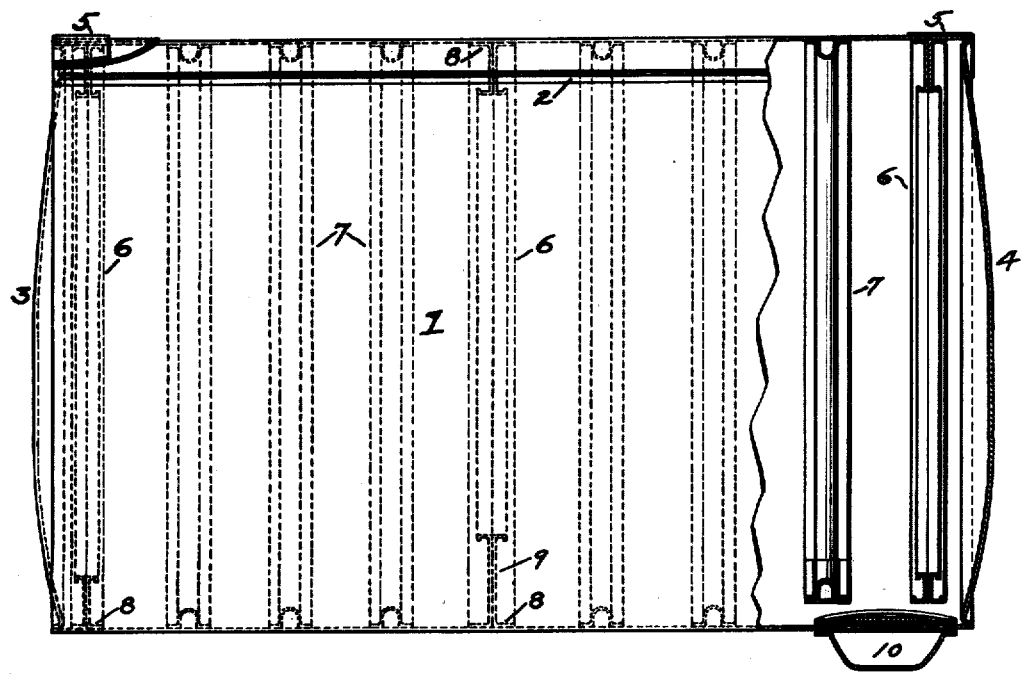
Fig. 2 is a side view, partially in section.

Within the tank, there is a series of strengthening members which are novel in such structures. These members comprise several continuous girders 6, between each pair of which are several U-shaped stiffening ribs 7. The girders and ribs are welded to the shell throughout its entire periphery. These girders, it should be noted, are continuous, and are formed in a drawing press. Each girder is built up of two pan-shaped members placed back to back and welded together. The flanges 8 of these girders, extending an equal distance on either side of the center line of the girders, as best shown in Fig. 2, serve to further strengthen the unit. The intermediate strengthening ribs may be built up in any suitable manner but are preferably formed in one piece, or in two halves. If formed in halves, they are joined preferably at the top of the tank in either a scarf joint or a butt joint. If a joint is used, it is desirable that it should be made at the top of the tank, where the stresses are of less severity than at the bottom.

The center girder is of slightly different structure than either end girder, in that it is of considerably greater width, 9, (see Figs. 2 and 3) throughout its bottom and sides. When the device is used for fluid storage in aircraft, this construction is desirable because in some air maneuvers, such as diving, the greatest bending moment occurs at this point in the tank, and a girder of this type offsets any ill effects from such maneuvering. The two end girders are of the same width throughout their lengths, with the exception of the girder in the right-hand end of the tank, as shown in Fig. 2. This particular girder is bridged across the sump 10, permitting an unrestricted flow of liquid into the sump. Likewise, the stiffening rib immediately adjacent this girder is also bridged across the sump, for the same reason. The remaining girders and stiffening ribs are usually all provided with drainage holes 11, as is common in most tanks of this type. The tank is provided with the usual filler opening, vent, and gauges.

It will thus be apparent that the above described construction affords a tank which in the first place is extremely light and simple to construct, has a minimum number of structural members, in that it is completely free of the ordinary cumbersome baffle plates and tie rods, is less susceptible to failure because no rivets are employed, and in which the forces from usage are not localized in any particular part of the tank, but distributed over its entire surface, due to the fact that all members are unitarily and intimately joined to the shell.

While the invention has been described hereinabove with reference to certain embodiments thereof which are now preferred, it will be understood that it may be otherwise embodied without departing from the spirit of the invenion or the scope of the appended claims.

I claim:

1. A tank comprising a thin gauge metal shell having a closure secured at each end thereof, a plurality of spaced continuous girder supporting members within and joined to said shell, one of said members being of greater depth throughout its bottom and sides than at its top.

2. A tank comprising a thin gauge metal shell having a closure secured at each end thereof, a plurality of spaced continuous girder supporting members, one of said members being of greater depth throughout its bottom and sides than at its top, a plurality of rib stiffening members intermediate the girder supporting members, said members conforming to the contour of said tank and being joined to the inner surface of said shell.

3. A tank comprising a thin gauge metal shell having a closure secured at each end thereof, a plurality of girder supporting members conforming to the contour of said tank and being joined to the inner surface thereof, one of said members being adjacent each said closure and another of said members being intermediate said other members, said intermediate member being of greater depth throughout its bottom and sides than at its top, thereby strengthening said tank at the point of greatest bending moment.

4. A tank comprising a thin gauge metal shell having a closure secured at each end thereof, a continuous girder supporting member conforming to the contour of and being joined to the inner surface of said shell, said member being of greater depth throughout its bottom and sides than at its top.

5. A tank comprising a thin gauge metal shell having a closure secured at each end thereof, a plurality of spaced grider supporting and rib stiffening members conforming to the contour of the tank and being joined to the inner surface of said shell, said rib stiffening members being intermediate said girder supporting members, one of said girder supporting members being adjacent each said closure, another of said girder supporting members being intermediate said other girder supporting members, said intermediate girder supporting member being of greater depth throughout its bottom and sides than at its top, thereby acting as a baffle and strengthening said tank at the point of greatest bending moment.

FREDERICK V. HARTMAN.

CERTIFICATE OF CORRECTION.

Patent No. 2,154,044.             April 11, 1939.

FREDERICK V. HARTMAN.

It is hereby certified that error appears in the printed specification of the above numbered patent requiring correction as follows: Page 2, second column, line 21, claim 5, for "grider" read girder; and that the said Letters Patent should be read with this correction therein that the same may conform to the record of the case in the Patent Office.

Signed and sealed this 6th day of June, A. D. 1939.

Henry Van Arsdale (Seal).            Acting Commissioner of Patents.

tank is provided with the usual filler opening, vent, and gauges.

It will thus be apparent that the above described construction affords a tank which in the first place is extremely light and simple to construct, has a minimum number of structural members, in that it is completely free of the ordinary cumbersome baffle plates and tie rods, is less susceptible to failure because no rivets are employed, and in which the forces from usage are not localized in any particular part of the tank, but distributed over its entire surface, due to the fact that all members are unitarily and intimately joined to the shell.

While the invention has been described hereinabove with reference to certain embodiments thereof which are now preferred, it will be understood that it may be otherwise embodied without departing from the spirit of the invenion or the scope of the appended claims.

I claim:

1. A tank comprising a thin gauge metal shell having a closure secured at each end thereof, a plurality of spaced continuous girder supporting members within and joined to said shell, one of said members being of greater depth throughout its bottom and sides than at its top.

2. A tank comprising a thin gauge metal shell having a closure secured at each end thereof, a plurality of spaced continuous girder supporting members, one of said members being of greater depth throughout its bottom and sides than at its top, a plurality of rib stiffening members intermediate the girder supporting members, said members conforming to the contour of said tank and being joined to the inner surface of said shell.

3. A tank comprising a thin gauge metal shell having a closure secured at each end thereof, a plurality of girder supporting members conforming to the contour of said tank and being joined to the inner surface thereof, one of said members being adjacent each said closure and another of said members being intermediate said other members, said intermediate member being of greater depth throughout its bottom and sides than at its top, thereby strengthening said tank at the point of greatest bending moment.

4. A tank comprising a thin gauge metal shell having a closure secured at each end thereof, a continuous girder supporting member conforming to the contour of and being joined to the inner surface of said shell, said member being of greater depth throughout its bottom and sides than at its top.

5. A tank comprising a thin gauge metal shell having a closure secured at each end thereof, a plurality of spaced grider supporting and rib stiffening members conforming to the contour of the tank and being joined to the inner surface of said shell, said rib stiffening members being intermediate said girder supporting members, one of said girder supporting members being adjacent each said closure, another of said girder supporting members being intermediate said other girder supporting members, said intermediate girder supporting member being of greater depth throughout its bottom and sides than at its top, thereby acting as a baffle and strengthening said tank at the point of greatest bending moment.

FREDERICK V. HARTMAN.

CERTIFICATE OF CORRECTION.

Patent No. 2,154,044.                                April 11, 1939.

FREDERICK V. HARTMAN.

It is hereby certified that error appears in the printed specification of the above numbered patent requiring correction as follows: Page 2, second column, line 21, claim 5, for "grider" read girder; and that the said Letters Patent should be read with this correction therein that the same may conform to the record of the case in the Patent Office.

Signed and sealed this 6th day of June, A. D. 1939.

Henry Van Arsdale (Seal).                            Acting Commissioner of Patents.